(12) United States Patent
Chen et al.

(10) Patent No.: US 11,451,176 B2
(45) Date of Patent: Sep. 20, 2022

(54) APPARATUS AND METHOD FOR ASCERTAINING A ROTOR POSITION, AND ELECTRIC DRIVE SYSTEM

(71) Applicant: Robert Bosch GmbH, Stuttgart (DE)

(72) Inventors: Lei Chen, Stuttgart (DE); Sebastian Paulus, Esslingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/416,637

(22) PCT Filed: Dec. 6, 2019

(86) PCT No.: PCT/EP2019/084010
§ 371 (c)(1),
(2) Date: Jun. 21, 2021

(87) PCT Pub. No.: WO2020/126553
PCT Pub. Date: Jun. 25, 2020

(65) Prior Publication Data
US 2022/0077799 A1 Mar. 10, 2022

(30) Foreign Application Priority Data
Dec. 20, 2018 (DE) .................... 10 2018 222 439.0

(51) Int. Cl.
*H02P 6/00* (2016.01)
*H02P 6/14* (2016.01)
*H02P 21/18* (2016.01)
*H02P 21/22* (2016.01)
*H02P 6/18* (2016.01)

(52) U.S. Cl.
CPC ............... *H02P 21/18* (2016.02); *H02P 6/18* (2013.01); *H02P 21/22* (2016.02)

(58) Field of Classification Search
CPC ............. H02P 21/18; H02P 21/22; H02P 6/18
USPC ..................................... 318/400.01
See application file for complete search history.

(56) References Cited

U.S. PATENT DOCUMENTS

2002/0158658 A1* 10/2002 Godbersen ............. G01R 31/34
324/545
2003/0020429 A1* 1/2003 Masaki ..................... H02P 6/18
318/727
(Continued)

FOREIGN PATENT DOCUMENTS

DE 102013204194 A1 9/2014
DE 102016224374 A1 6/2018

OTHER PUBLICATIONS

Translation of International Search Report for Application No. PCT/EP2019/084010 dated Feb. 13, 2020 (2 pages).

*Primary Examiner* — Erick D Glass
(74) *Attorney, Agent, or Firm* — Michael Best & Friedrich LLP

(57) ABSTRACT

Signal processing for determining a rotor position without the use of encoders. To this end, test signals are applied to the electrical currents in the phase connections of an electric machine, and the total currents in the phase connections of the electric machine are measured. The current responses to the test signals are determined by establishing the difference between the measured phase currents and the setpoint-value settings for the phase currents. On the basis of this difference, any method for calculating the rotor angle position can be performed.

7 Claims, 2 Drawing Sheets

(56) References Cited

U.S. PATENT DOCUMENTS

| | | | |
|---|---|---|---|
| 2006/0061319 A1* | 3/2006 | Markunas | H02P 21/26 318/712 |
| 2008/0111516 A1* | 5/2008 | Inokuma | H02P 21/14 318/799 |
| 2009/0039810 A1* | 2/2009 | Gotz | H02P 21/0085 318/400.32 |
| 2019/0296666 A1* | 9/2019 | Pramod | H02P 21/05 |

* cited by examiner

APPARATUS AND METHOD FOR ASCERTAINING A ROTOR POSITION, AND ELECTRIC DRIVE SYSTEM

BACKGROUND OF THE INVENTION

The present invention relates to an apparatus and a method for ascertaining a rotor position of an electric machine and an electric drive system.

Electric machines, in particular synchronous machines, are of particular significance in the development of drive concepts for electric and hybrid vehicles. In order to provide a required torque for a synchronous machine, a rotating magnetic field is generated in the stator of the machine which rotates in synchronism with the rotor. The present angle of the rotor is required for the closed-loop control of the synchronous machine and the generation of the magnetic field. The present rotor angle can in this case be ascertained by means of an additional angle sensor or by means of a sensorless method for angle determination.

The document DE 10 2013 204 194 A1 discloses a method for operating a synchronous machine. In this case, a working-point trajectory of the synchronous machine is set in such a way that a difference between the d inductance and q inductance of the synchronous machine in the rotor-fixed coordinate system is as high as possible. The working-point trajectory of the synchronous machine is established using a family of characteristics to be predetermined over all possible 2-tupels of useful energization values in the rotor-fixed coordinate system in which the amplitude of the system responses is plotted as isohypses.

SUMMARY OF THE INVENTION

The present invention provides an apparatus for ascertaining a rotor position of an electric machine, an electric drive system, and a method for ascertaining a rotor position of an electric machine.

Accordingly, the following is provided:

An apparatus for ascertaining a rotor position of an electric machine, comprising a current sensor, an input terminal and a processing device. The current sensor is designed to detect measured values of the electrical phase currents at the terminals of the electric machine. The input terminal is designed to receive a setpoint variable for the electrical phase currents of the electric machine. The processing device is designed to form a difference between the measured values detected by the current sensor and the setpoint variable for the electrical phase currents. Furthermore, the processing device is designed to ascertain the rotor position of the electric machine using the difference formed.

Furthermore, the following is provided:

An electric drive system comprising an electric machine, a power converter and an apparatus according to the invention for ascertaining a rotor position of an electric machine. The power converter is designed to provide an electrical current at the terminals of the electric machine using a setpoint variable.

In addition, the following is provided:

A method for ascertaining a rotor position of an electric machine comprising the steps of detection of measured values of electrical phase currents at the terminals of the electric machine; reception of a setpoint variable for the electrical phase currents of the electric machine; formation of a difference between the measured values detected by the current sensor and the setpoint variable for the electrical phase currents; and ascertainment of the rotor position of the electric machine using the difference formed.

Advantages of the Invention

The present invention is based on the finding that, for sensorless ascertainment of a rotor position of an electric machine, generally test signals are injected at the phase terminals of the electric machine, and thereupon the response of the electric machine, in particular the currents resulting from the test pulses, is evaluated in order to draw conclusions herefrom in respect of the present rotor position of the electric machine. The present invention is furthermore based on the finding that, for the operation of the electric machine, in addition to the test pulses electrical currents are also injected at the phase terminals of the electric machine in order to generate a desired torque. For the determination of the rotor position on the basis of the currents resulting from the test pulses, therefore, the current component for the generation of the torque needs to be removed from a total current. Conventional methods are based, for example, on high-pass filtering. Depending on the limit frequency selected for such a high-pass filter, conflicts with the test signals for the rotor angle determination may arise in this case.

It is therefore a concept of the present invention to take this finding into account and to provide optimized signal processing for ascertaining a sensorless rotor angle determination. For this purpose, the present invention proposes using computation technology to eliminate the current component for setting a desired torque from a measured total current at the phase terminals of the electric machine. In particular, for this purpose, knowledge of the setpoint value of the electrical current for the desired torque can be used. This setpoint value is generally known and available. For example, this setpoint value is provided to a power converter, which feeds the electric machine. In particular, in the process the fundamental wave or fundamental component of the electrical current in accordance with the setpoint value preset can be subtracted from the total current detected using measurement technology at the phase terminals of the electric machine.

In this way, there is consequently a current signal available as the difference between the currents detected using measurement technology at the phase terminals of the electric machine and the electrical current known in accordance with the setpoint value preset for the drive of the electric machine, which current signal reflects very well the response of the electric machine to the test pulses for the sensorless rotor angle determination. Therefore, this difference can be used as the starting basis for the further calculation of the rotor angle position of the electric machine.

The test pulses used in this case for the rotor angle determination which are injected at the phase terminals of the electric machine as well as the specific computation method for determining the rotor angle position can in this case be selected virtually as desired. In particular, depending on the operating state of the electric machine, different methods can also be selected. For example, a decision can be made between a machine at a standstill, a slowly-rotating electric machine, and a quickly-rotating machine. Furthermore, it is of course also possible for any other desired decision relating to the operating states of the electric machine to be made. In this case, any desired already known conventional methods can be used, or else novel approaches for calculating the rotor angle position on the basis of current signals as a result of test pulses.

The approach according to the invention can be used for any desired electric machines which enable sensorless rotor angle determination on the basis of test pulses. Mentioned by way of example here is a synchronous machine, in particular a polyphase, for example three-phase, synchronous machine.

In accordance with one embodiment, the apparatus for ascertaining the rotor position is a filter device. The filter device can be designed to perform low-pass filtering of the setpoint variable for the electrical phase currents. In particular, the limit frequency of the filter device can correspond to a set frequency for a fundamental wave of the current controller of the electric machine. Thereupon, the current characteristic to be expected can be calculated from the desired setpoint current of the fundamental wave according to a model of the system behavior. If there are no remaining control deviations, after the formation of the difference with the measured actual current the result will now only contain the excited frequencies of the sensorless method for rotor angle determination.

In accordance with one embodiment, the processing device comprises a transformation device. The transformation device is designed to transform the measured values of the electrical currents at the phase terminals. In particular, the transformation device can perform a transformation of the electrical currents into a rotor-fixed system. The transformation can take place, for example, by means of a processor or programmable logic. Furthermore, any other desired apparatuses which perform the required transformations are also possible.

In accordance with one embodiment, the transformations by the transformation device comprise a Clarke transformation and a Park transformation of the measured values of the electrical currents at the phase terminals. The transformation device can, for example, in a first transformation step, convert the measured values of the electrical currents in the individual phases of the electric machine into a simpler two-axis coordinate system. The two axes of the two-axis coordinate system can be denoted by $\alpha$ and $\beta$, for example. Correspondingly, the Clarke transformation is also referred to as $\alpha$-$\beta$ transformation. In a further step, the values of the $\alpha$-$\beta$ coordinate system based on the stator can be converted into a rotor-fixed d/q coordinate system. Such a d/q transformation is also known as Park transformation.

In accordance with one embodiment, the processing device is designed to ascertain the rotor position of the electric machine during standstill, slow rotation and/or quick rotation of the rotor. In particular, it is possible, depending on the operating state, i.e. rotational speed of the rotor, to use a different method for determining the rotor position.

In accordance with one embodiment, the apparatus for ascertaining the rotor position comprises a signal generation device. The signal generation device can be designed to generate test signals. The signal generation device can further be designed to superimpose the generated test signals on the electrical currents at the phase terminals of the electric machine. In this way, a combination of test signals and electrical currents for setting the desired torque or the desired speed is injected at the phase terminals of the electric machine. By virtue of the separation according to the invention, it is then possible to extract the response of the electric machine to the test signals in the measured current values, and then to calculate the rotor position from this.

The above configurations and developments, where expedient, can be combined with one another as desired. Further configurations, developments and implementations of the invention also include combinations of the features of the invention described above and below in respect of the exemplary embodiments which are not explicitly mentioned. In particular, a person skilled in the art will in this case also add individual aspects as improvements or additions to the respective basic forms of the present invention.

BRIEF DESCRIPTION OF THE DRAWINGS

The present invention will be explained in more detail below with reference to the exemplary embodiments specified in the schematic figures in the drawings, in which.

DETAILED DESCRIPTION

Figure 1:
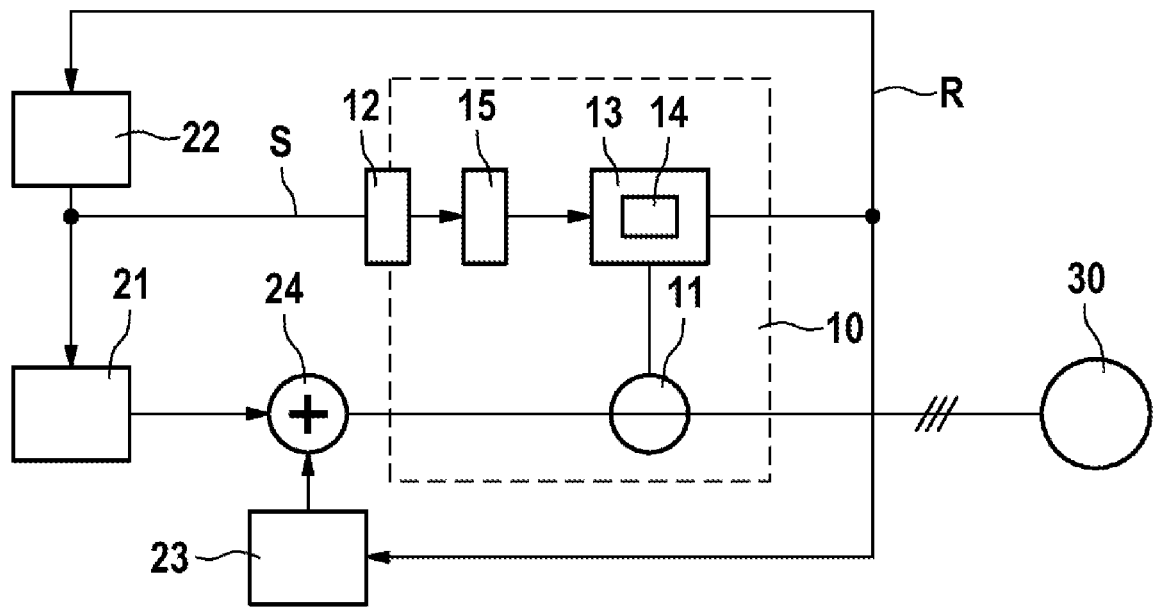
FIG. 1 shows a schematic illustration of an electric drive system in accordance with one embodiment.

FIG. 1 shows a schematic illustration of a basic circuit diagram of an electric drive system in accordance with one embodiment. The electric drive system comprises an electric machine 30, which is fed by an electrical power converter 21. For example, the electric machine 30 may be a polyphase, in particular a three-phase, synchronous machine. In this case, a three-phase electrical current can be provided by the power converter 21 at the phase terminals of the electric machine 30. For example, the power converter 21 can set the phase currents at the electric machine 30 on the basis of a setpoint value preset S. In the case of a polyphase electric machine 30, for example, a plurality of AC voltages or alternating currents which are phase-shifted with respect to one another can be provided by the power converter 21. The AC voltages provided by the power converter 21 in this case have a frequency which is dependent on the rotational frequency of the electric machine 30.

The setpoint value preset S for the electrical phase currents to be set by the power converter 21 can be preset, for example, by a control device 22. For example, the control device 22 can preset a setpoint value for the phase currents to be set using a preset for a torque to be set, a desired speed or other parameters. In this case, the control device 22 can, for example, also additionally use the present rotor position.

In order to ascertain the rotor position of the electric machine 30, a test signal can be generated by means of a signal generation device 23. This test signal may be, for example, predetermined voltage pulses or sequences of predetermined voltage pulses. These test signals are impressed simultaneously or alternately in the individual phases of the electric machine 30. For this purpose, the test signals generated by the signal generation device 23 can be superimposed, by means of a superimposition device 24, on the electrical currents provided by the power converter 21. Alternatively, it is also possible for the superimposition to be performed even upstream of the power converter 21. In this case, the superimposition device 24 can combine the setpoint values and supply them as common setpoint variable to the power converter 21.

In order to evaluate the rotor position of the electric machine 30, knowledge of the response of the electric machine 30 to the impressed test pulses is necessary. For this purpose, the electrical currents in the feed lines to the phase terminals of the electric machine 30 can be measured by means of one or more current sensors 11, for example. The electrical currents measured in the process therefore comprise a combination of the electrical phase currents from the power converter 21 and the electrical currents which are brought about in response to the test pulses in the electric machine 30. For the further signal processing for determining the rotor position, therefore, the components of the electrical currents as a result of the test pulses need to be extracted from the measured values for the total current or the total currents.

The apparatus 10 for ascertaining the rotor position comprises, in addition to the current sensor(s) 11, an input terminal 12, and a processing device 13. The input terminal 12 can be coupled to the control device 22, for example. In particular, the input terminal 12 can receive the setpoint value preset S for the electrical phase currents to be set. This may be the same setpoint value preset S which is also provided at the power converter 21. By means of the received setpoint value preset S for the electrical phase currents of the electric machine 30 and the measured values for the electrical phase currents, the processing device 13 can thereupon form a difference between the measured values of the measured phase currents and the received setpoint value preset. By virtue of this difference formation, therefore, the current component is eliminated by the electrical power converter 21 from the total current at the phase terminals of the electric machine 30. Therefore, the current responses to the test signals generated by the signal generation device 23 remain as residual signals.

In particular, low-pass filtering of the setpoint variable S for the electrical phase currents can be performed. For this purpose, a filter apparatus 15 can be provided in the apparatus 10 for ascertaining the rotor position. For example, the limit frequency of the filter device 15 can correspond to a set frequency for a fundamental wave of the power converter 21 of the electric machine 30. Thereupon, the current characteristic to be expected can be calculated from the desired setpoint current of the fundamental wave according to a model of the system behavior. If there are no remaining control deviations, once the difference has been formed with the measured actual current, the result will now only contain the excited frequencies of the sensorless method for rotor angle determination.

Using these current responses, the processing device 13 can thereupon calculate the rotor position R, in particular the rotor angle of the electric machine 30. For this purpose, any desired suitable methods for calculating the rotor position are possible. Depending on the method, it is also possible in this case to determine a change in the rotor angle over time. For this purpose, any desired conventional or else novel methods for calculating the rotor angle position of an electric machine can be used. In particular, both the generation of the test signals and the associated computation method for calculating the rotor angle position can be matched to the respective application case and the connected electric machine 30. Since numerous conventional methods are already known, no detailed explanation will be given here.

The ascertained rotor position R can be made available, for example, to the control device 22 for the current regulation, with the result that the control device 22 can perform further closed-loop control of the electric machine 30 using the rotor position R. In addition or as an alternative, the rotor position R can also be made available to the signal generation device 23, and the generation of the test signals or test pulses can be adapted correspondingly.

For the determination of the current components for calculating the rotor angle position R, in particular the measured values from the current sensor(s) 11 can be conditioned in a suitable manner. For this purpose, it is possible, for example, to use one or more transformations in order to simplify the difference formation between measured values and setpoint value preset. For example, the plurality of measured electrical phase currents can be converted into a coordinate system with two axes ($\alpha$, $\beta$) by means of a suitable transformation, for example a Clarke or $\alpha/\beta$ transformation. In addition, for example, a transformation from a stator-fixed coordinate system to a rotor-fixed coordinate system can also be performed. For this purpose, for example, a Park or d/q transformation is possible. In particular when the setpoint value presets for the electrical phase currents to be set are also present in a corresponding coordinate system, the measured values of the phase currents can also be converted into a corresponding coordinate system by means of suitable transformation. For example, such transformations can be performed in a transformation device 14 of the processing device 13.

Figure 2:
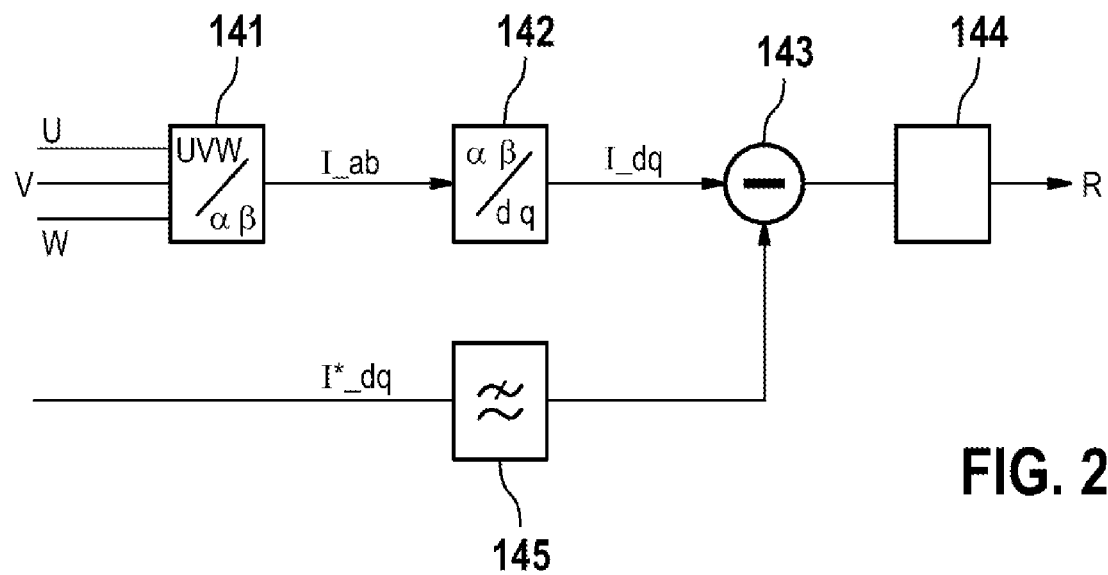
FIG. 2 shows a schematic illustration of a block circuit diagram for determining the signals for ascertaining the rotor position of an electric machine.

FIG. 2 shows a schematic illustration of a block circuit diagram for ascertaining the current responses of the test signals for a rotor angle determination.

A first transformation block 141 can receive, for example, the measured values U, V, W from the current sensors 11 as individual phase currents. Thereupon, the individual phase currents can be converted, for example, into an $\alpha$-$\beta$ coordinate system by means of a suitable transformation, for example a Clarke transformation. The first transformation block 141 therefore provides, as intermediate result, an electrical current I_ab in an $\alpha/\beta$ coordinate system. This current I_ab can be converted, by means of a second transformation block 142, into a rotor-fixed coordinate system, for example a d/q coordinate system. Therefore, the second transformation block 142 provides an electrical current I_dq in a rotor-fixed coordinate system. This current I_dq is supplied to a differential element 143. Furthermore, the setpoint value preset for the electrical current to be set by the power converter 21 is likewise supplied in the d-q coordinate system as current I*_dq to the differential element 143. In this case, if appropriate, low-pass filtering of the setpoint value preset can take place. For the low-pass filtering, for example, a low-pass filter 145 can be provided. The limit frequency of the low-pass filter 145 can correspond in particular to the limit frequency of a dq current controller. The difference between the two currents I_dq and I*_dq is thereupon used in a further processing block 144 for calculating the rotor angle position R.

Figure 3:
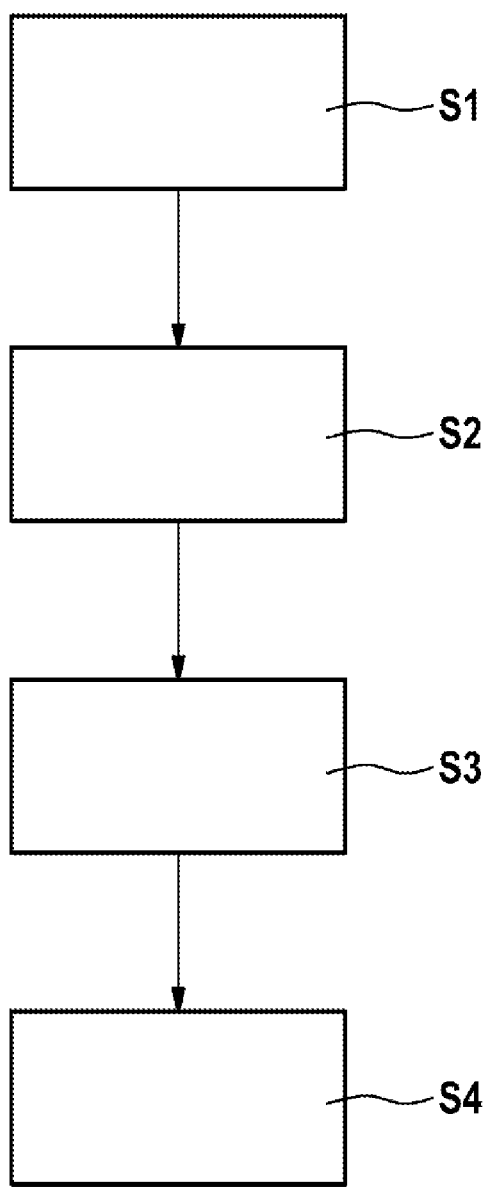
FIG. 3 shows a schematic illustration of a flowchart for a method for ascertaining the rotor position in accordance with one embodiment.

FIG. 3 shows a schematic illustration of a flowchart forming the basis for a method for ascertaining a rotor position of an electric machine 30. The method comprises a step S1 for detecting measured values of the electrical currents at the phase terminals of the electric machine 30. In a step S2, a setpoint variable S for electrical phase currents of the electric machine 30 is received. In step S3, a difference between the detected measured values of the electrical currents at the phase terminals and the setpoint variable S for the electrical phase currents is formed. Finally, in step S4, the rotor position of the electric machine 30 is ascertained using the difference formed.

Furthermore, all operations which have previously been described in connection with the apparatus are possible for the method.

By way of summary, the present invention relates to signal processing for sensorless determination of a rotor position. For this purpose, the electrical currents at the phase terminals of an electric machine are subjected to test signals, and the total currents at the phase terminals of the electric machine are measured. The current responses to the test signals are determined by forming the difference between the measured phase currents and the setpoint value presets for the phase currents. On the basis of this difference, any desired method for calculating the rotor angle position can be performed.

The invention claimed is:

1. An apparatus (10) for ascertaining a rotor position of an electric machine (30), the apparatus comprising:
   a power converter (21) configured to provide electrical currents at the terminals of the electric machine (30) using a setpoint variable (S);
   a current sensor (11) configured to detect measured values of the electrical phase currents at the terminals of the electric machine (30);
   an input terminal (12) configured to receive a setpoint variable (S) for electrical phase currents of the electric machine (30);
   a processing device (13) configured to form a difference between the measured values detected by the current sensor and the setpoint variable (S) for the electrical phase currents, and to ascertain the rotor position of the electric machine (30) using the difference formed; and
   a signal generation device (23), which is configured to generate test signals and to superimpose the generated test signals on the electrical currents provided by the power converter (21) at the phase terminals of the electric machine (30).

2. The apparatus (10) as claimed in claim 1, comprising a filter device (15) configured to perform low-pass filtering of the setpoint variable (S) for the electrical phase currents.

3. The apparatus (10) as claimed in claim 1, wherein the processing device (13) comprises a transformation device (14) configured to transform the measured values of the electrical phase currents at the terminals into a rotor-fixed system.

4. The apparatus (10) as claimed in claim 3, wherein the transformation device (14) is configured to perform a Clarke transformation and a Park transformation of the measured values of the electrical phase currents at the terminals.

5. The apparatus (10) as claimed in claim 1, wherein the processing device (13) is configured to ascertain the rotor position of the electric machine (30) during standstill, slow rotation and/or quick rotation of the rotor.

6. An electric drive system, comprising:
   an electric machine (30);
   a power converter (21) configured to provide electrical currents at the terminals of the electric machine (30) using a setpoint variable (S); and
   an apparatus (10) for ascertaining a rotor position of an electric machine (30), the apparatus including
      a signal generation device (23), which is configured to generate test signals and to superimpose the generated test signals on the electrical currents provided by the power converter (21) at the phase terminals of the electric machine (30);
      a current sensor (11) configured to detect measured values of the electrical phase currents at the terminals of the electric machine (30);
      an input terminal (12) configured to receive a setpoint variable (S) for electrical phase currents of the electric machine (30); and
      a processing device (13) configured to form a difference between the measured values detected by the current sensor and the setpoint variable (S) for the electrical phase currents, and to ascertain the rotor position of the electric machine (30) using the difference formed.

7. A method for ascertaining a rotor position of an electric machine (30), the method comprising the following steps:
   generation and superposition of test signals on electrical currents provided by a power converter (21) at the phase terminals of the electric machine (30);
   detection (S1) of measured values of the electrical phase currents at the terminals of the electric machine (30);
   reception (S2) of a setpoint variable for electrical phase currents of the electric machine (30);
   formation (S3) of a difference between the detected measured values of the electrical currents at the phase terminals of the electric machine (30) and the setpoint variable (S) for the electrical phase currents; and
   ascertainment (S4) of the rotor position of the electric machine (30) using the difference formed.

* * * * *